United States Patent
Wang et al.

(10) Patent No.: US 9,286,116 B2
(45) Date of Patent: Mar. 15, 2016

(54) MULTIPLE CORE REAL-TIME TASK EXECUTION

(75) Inventors: Chih-Yung Wang, Beijing (CN); Kun Tan, Beijing (CN); Yongguang Zhang, Beijing (CN); Qiufeng Yin, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 547 days.

(21) Appl. No.: 13/543,231

(22) Filed: Jul. 6, 2012

(65) Prior Publication Data
US 2014/0013330 A1    Jan. 9, 2014

(51) Int. Cl.
G06F 9/46 (2006.01)
G06F 7/38 (2006.01)
G06F 9/48 (2006.01)
G06F 9/52 (2006.01)

(52) U.S. Cl.
CPC .............. *G06F 9/4856* (2013.01); *G06F 9/524* (2013.01)

(58) Field of Classification Search
None
See application file for complete search history.

(56) References Cited

U.S. PATENT DOCUMENTS

| 7,827,551 | B2 | 11/2010 | Kulbak et al. |
| 2007/0067771 | A1 | 3/2007 | Kulbak et al. |
| 2008/0263324 | A1 | 10/2008 | Sutardja et al. |
| 2009/0165014 | A1 | 6/2009 | Park |
| 2010/0268912 | A1 | 10/2010 | Conte et al. |
| 2011/0088041 | A1 | 4/2011 | Alameldeen et al. |

OTHER PUBLICATIONS

Cong et al., Accelerating Sequential Applications on CMPs Using Core Spilling; IEEE Transactions on Parallel and Distributed Systems, vol. 18, No. 8, Aug. 2007.*
Strong et al., "Fast Switching of threads Between Cores", ACM SIGOPS Operating System Review, vol. 43, Issue 2, Apr. 2009, 11 pages.
Zhang et al., "Towards the Implementation and Evaluation of Semi-Partitioned Multi-Core Scheduling", Workshop on Brining Theory to Practice: Predictability and Performance Embedded Systems (PPES 2011), Mar. 2011, pp. 42-46.

* cited by examiner

*Primary Examiner* — Meng An
*Assistant Examiner* — Bing Zhao
(74) *Attorney, Agent, or Firm* — Sandy Swain; Micky Minhas; Lee & Hayes, PLLC (57) ABSTRACT

A real-time task may initially be performed by a first thread that is executing on a first core of a multi-core processor. A second thread may be initiated to take over the performance of the real-time task on a second core of the multi-core processor while the first thread is performing the real-time task. The performance of the real-time tasks is then transferred from the first thread to the second thread with the execution of the second thread on the second core to perform the real-time task.

20 Claims, 5 Drawing Sheets

MULTIPLE CORE REAL-TIME TASK EXECUTION

BACKGROUND

Real-time tasks are high priority tasks that are to be executed in real-time without delay by a processor of a computing device. For example, it may be essential for a computing device that is communicating with a network to perform the task of parsing out data from a communication signal without delay to avoid losing data. Real-time tasks may be performed by high priority threads that are executed by the processor. However, the continuous execution of real-time tasks using high priority threads on a processor may block other system threads that are performing non real-time tasks from being executed by the processor. The blocking of such system threads from execution may cause deadlocked applications, disabled application features, and/or general unresponsiveness in the operations of applications on the computing device.

The blocking of system threads that are executing non real-time tasks may also occur on a computing device with a multi-core processor. For example, many system applications that are running on a computing device may have been programmed to run threads on specific cores. Thus, when these specific cores are blocked by high priority threads that are running real-time tasks, slowdowns of the applications on the computing device may still occur.

SUMMARY

Described herein are techniques for scheduling a real-time task to switch dynamically among the cores of a multi-core processor. The switch of the real-time task may prevent the real-time task from blocking a particular core from executing other non real-time tasks. The switch of the real-time task includes the transfer the real-time task from being performed by a thread that is executing on a current core to another thread that is executing on another core.

In at least one embodiment, a real-time task may initially be performed by a first thread that is executing on a first core of a multi-core processor. A second thread may be initiated to take over the performance of the real-time task on a second core of the multi-core processor while the first thread is still performing the real-time task. The performance of the real-time task is then transferred from the first thread to the second thread with the execution of the second thread on the second core to perform the real-time task.

Accordingly, the switching of a real-time task from being performed by the first thread to being performed by the second thread may free up the first core to execute another thread that performs a non real-time task. Further, by performing multiple instances of switching on a periodic basis, a computing device may reduce or eliminate system blockage caused by the continuous performance of real-time tasks. As a result, instances of deadlocked applications, disabled application features, and/or general unresponsiveness in the operations of applications executing on the computing device may be diminished.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are techniques for scheduling a real-time task to switch dynamically among the cores of a multi-core processor via multiple threads. The switch of the real-time task may prevent the real-time task from blocking a particular core from executing other non real-time tasks. The switch of the real-time task includes the transfer of the real-time task from being performed by a thread that is executing on a current core to another thread that is executing on an alternative core.

The switch involves the use of two threads that are executing on two different cores of the multi-core processor during a real-time task handoff period. During the handoff, the real-time task is performed by a current thread that is executing on a current core while a new thread to be executed on an alternative core is prepared for the takeover of the real-time task execution. Once the new thread is ready, the real-time task is switched to be performed by the new thread on the alternative core. Following the handoff, the current thread may be put in a wait state, which may enable the current thread and/or the current core to be called to perform a non real-time task.

Accordingly, the switching of a real-time task from being performed by a current thread executing on the current core of a multi-core processor to being performed by a new thread executing on the alternative core of the multi-core processor may free up the current thread and/or the alternative core to perform a non real-time task. Further, by performing multiple instances of switching on a periodic basis, a computing device may reduce or eliminate system blockage caused by the continuous performance of real-time tasks. As a result, instances of deadlocked applications, disabled application features, and/or general unresponsiveness in the operations of applications executing on the computing device may be diminished. Various examples of techniques for implementing dynamic switching of the performance of a real-time task from a current core to an alternative core in accordance with various embodiments are described below with reference to FIGS. 1-6.

Example Scheme

Figure 1:
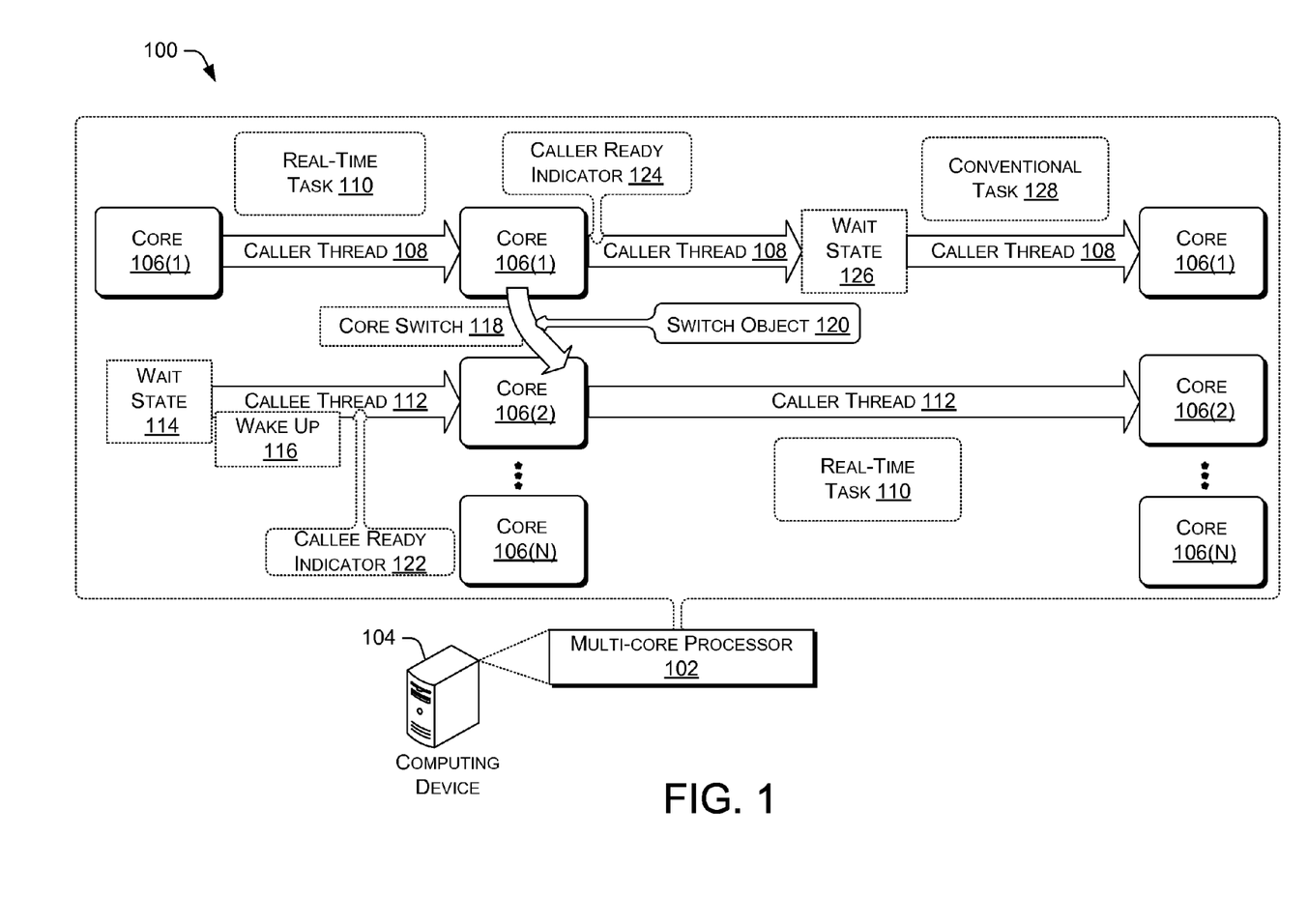
FIG. 1 is a block diagram that illustrates an example scheme that implements dynamic switching of a real-time task from being performed by a current thread executing on a current core to being performed by a new thread executing on an alternative core of a multi-core processor.

FIG. 1 is a block diagram that illustrates an example scheme 100 that implements dynamic switching of a real-time task from being performed by a current thread executing on a current core to being performed by a new thread executing on an alternative core of a multi-core processor 102. The multi-core processor 102 may be part of a computing device 104. In various embodiments, the computing device 104 may be a general purpose computer, such as a desktop computer, a tablet computer, a laptop computer, one or more servers, and so forth. However, in other embodiments, the computing device 104 may be one of a smart phone, a game console, a personal digital assistant (PDA), or any other electronic device that is equipping with a multi-core processor. The multi-core processor 102 may include cores 106(1)-106(N) that are capable of executing threads that perform real-time tasks. In some embodiments, the cores 106(1)-106(N) may be a subset of all the cores in the multi-core processor 102. For example, when the multi-core processor 102 has four cores (e.g., core "0", core "1", core "2", and core "3"), the number of cores included in the cores 106(1)-106(N) may be three (e.g., core "1", core "2", and core "3").

In operation, a caller thread 108 that is executing on the core 106(1) may be performing a real-time task 110. As used herein, the term "caller thread" may refer to a thread that is currently performing a real-time task. Further, a callee thread 112 may be in a wait state 114. As used herein, the term "callee thread" may refer to a thread that is expected to take over the performance of a real-time task. While executing, the caller thread 108 may continuously determine whether it is time to initiate a task handoff of the real-time task 110. The caller thread 108 may be configured to perform the task handoff if a predetermined time interval has elapsed (e.g., 128 milliseconds). If the caller thread 108 determines that it is time to perform the task handoff, the caller thread 108 may request an alternative core, such as the core 106(2), for the callee thread 112. The caller thread 108 may then initiate a wake up 116 of the callee thread 112, so that the callee thread 112 may take over the performance of the real-time task 110 on the core 106(2) during a core switch 118.

The caller thread 108 and the callee thread 112 may use a variable to handle the core switch 118. The variable may be included in a switch object 120. Further, the switch object 120 may be stored in a shared memory space that is accessible to both the caller thread 108 and the callee thread 112. Thus, when the callee thread 112 is ready to take over the performance of the real-time task 110 after the wake up 116, the callee thread 112 may write a callee ready indicator 122 to the variable in the shared memory space. Subsequently, the callee thread 112 may continuously check for a caller ready indicator 124 from the caller thread 108.

The caller thread 108, in turn, may periodically check for the callee ready indicator 122 from the callee thread 112. When the caller thread 108 detects the callee ready indicator 122 in the variable of the shared memory space, the caller thread 108 may write the caller ready indicator 124 to the variable and then enter a wait state 126. Subsequently, the caller thread 108 may be called by a scheduler to exit the wait state 126 and perform a conventional task 128 on the core 106(1) or another core of the multi-core processor 102. The conventional task 128 may be a non real-time task that tolerates at least some latency in performance. For example, the non real-time task may be a task associated with performing a spell check function for a text document. Alternatively, the core 106(1) may execute another previously queued thread that performs a non-real time task.

Additionally, when the callee thread 112 determines that the caller ready indicator is in the variable, the callee thread 112 may start performing the real-time task 110 on the core 106(2). In this way, the caller thread 108 and the callee thread 112 may complete the core switch 118 to move the performance of the real-time task 110 from the core 106(1) to the core 106(2). As a result, the core 106(1) may be freed up to perform non real-time tasks, such as the conventional task 128. Further, the callee thread 112 may become a caller thread that repeats a core switch with another callee thread for another real-time task.

In some embodiments, rather than the caller thread 108 requesting the core 106(2) for the callee thread 112, the callee thread 112 may request the core 106(2). In such embodiments, the callee thread 112 may determine if a predetermined time interval has elapsed while the callee thread 112 is in the wait state 114 and the caller thread 108 is performing the real-time task 110. The predetermined time interval may measure the amount of time that the caller thread 108 is executed on the core 106(1). If the callee thread 112 determines that the predetermined time interval has elapsed, the callee thread 112 may obtain an allocation of the core 106(2), and then write the callee ready indicator 122 to the variable in the shared memory space. As described above, when the caller thread 108 detects the callee ready indicator 122 in the variable of the shared memory space, the caller thread 108 may write the caller ready indicator 124 to the variable and then enter the wait state 126. In turn, when the callee thread 112 determines that the caller ready indicator 124 is in the variable, the callee thread 112 may start performing the real-time task 110 on the core 106(2).

Computing Device Components

Figure 2:
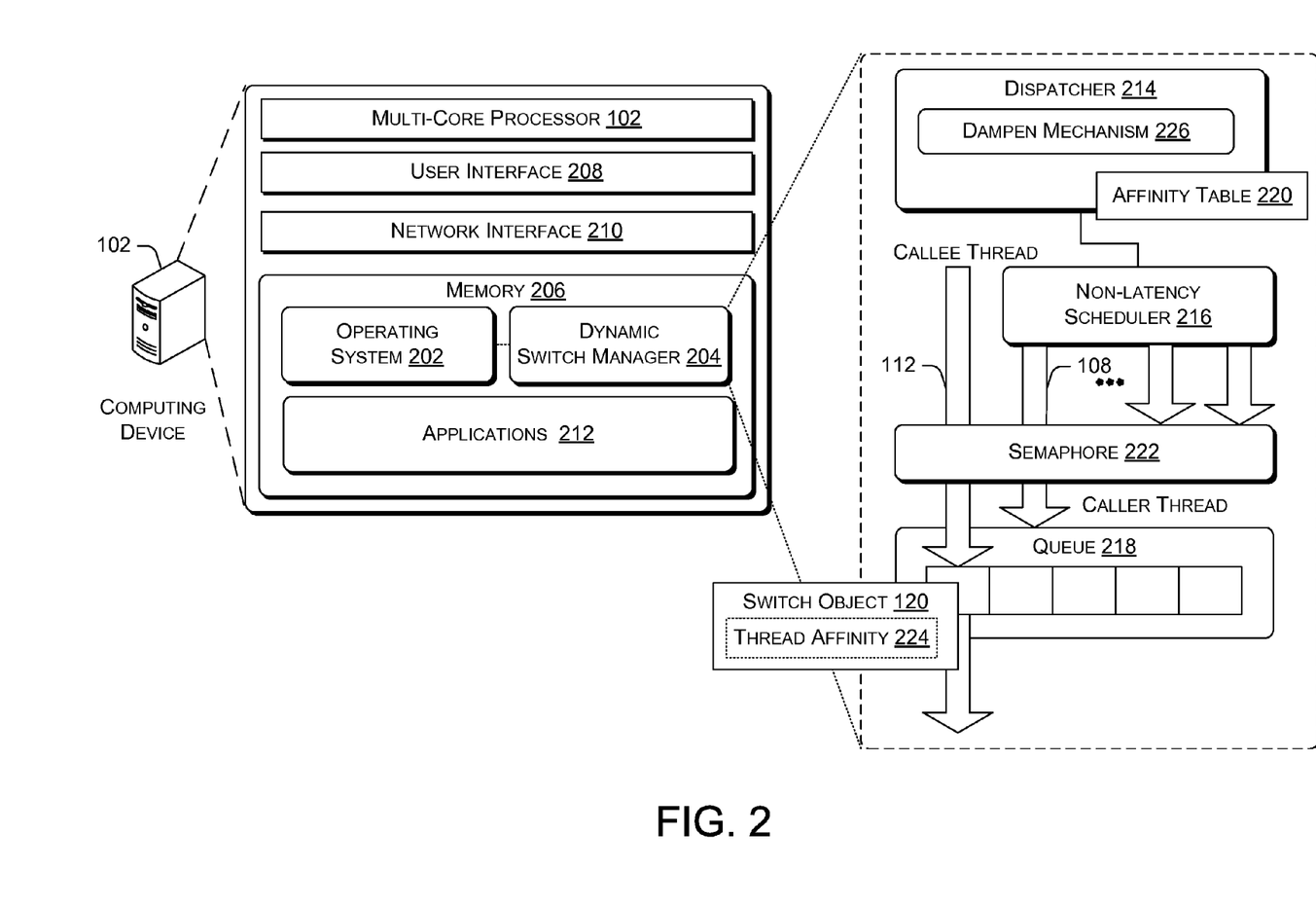
FIG. 2 is an illustrative diagram that shows example components of an operating system and a dynamic switch manager that implements the dynamic switching of the real-time task.

FIG. 2 is an illustrative diagram that shows example components of an operating system 202 and a dynamic switch manager 204 that implements the dynamic switching of the real-time task. The operating system 202 and the dynamic switch manager 204 may be implemented on the computing device 104.

The computing device 104 may include the multi-core processor 102, memory 206, a user interface 208, and a network interface 210. The memory 206 may be implemented using computer readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The user interface 208 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The network interface 210 may include wireless and/or wireless communication interface components that enable the computing device 104 to transmit and receive data via a network. In various embodiments, the wireless interface component may include, but is not limited to cellular, Wi-Fi, Ultra-wideband (UWB), Bluetooth, satellite transmissions, and/or so forth. The wired interface component may include a direct I/O interface, such as an Ethernet interface, a serial interface, a Universal Serial Bus (USB) interface, and/or so forth. As such, the computing device 104 may have network capabilities. For example, the computing device 104 may exchange data with other electronic devices (e.g., laptops computers, servers, etc.) via one or more networks, such as the Internet.

The multi-core processor 102 and the memory 206 of the computing device 104 may store the operating system 202, the dynamic switch manager 204, and applications 212. The operating system 202 may include components that enable the computing device 104 to receive data via various inputs (e.g., user controls, network interfaces, and/or memory devices), and process the data using the multi-core processor 102 to generate output. The operating system 202 may further include one or more components that present the output (e.g., display an image on an electronic display, store data in memory, transmit data to another electronic device, etc.). Additionally, the operating system 202 may include other components that perform various other functions generally associated with an operating system, such as processing data for the applications 212.

The dynamic switch manager 204 may work cooperatively with the operating system 202 to manage the threads that processes the data. The threads may include one or more threads that perform real-time tasks (e.g., real-time task 110), as well as one or more threads that perform non real-time tasks (e.g., the conventional task 128). In some embodiments, the dynamic switch manager 204 may include application program interfaces (APIs) that may be called by the operating system 202, so that the operating system 202 may leverage the dynamic switch manager 204 to manage the dynamic switching of real-time tasks between threads that are executed by the multi-core processor 102. In other embodiments, the dynamic switch manager 204 may be an integral part of the operating system 202.

The dynamic switch manager 204 may include a dispatcher 214, at least one non-latency scheduler 216, and a queue 218. The dispatcher 214 may allocate cores 106(1)-106(N) of the multi-core processor 102 to execute threads that perform different tasks. The allocation of the cores 106(1)-106(N) by the dispatcher 214 may be on a round robin basis, a fair use basis, a random order basis, or on some other basis. The dispatcher 214 may use an affinity table 220 to track the availability of the cores 106(1)-106(N) to process threads, as well as assign particular cores to specific threads. For example, the affinity table 220 may indicate that the caller thread 108 has an affinity for core 106(1) when the caller thread 108 is allocated to execute on the core 106(1).

The non-latency scheduler 216 may be responsible for managing the execution of threads that perform real-time tasks. In some embodiments, the dynamic switch manager 204 may include multiple non-latency schedulers. In such embodiments, the multiple non-latency schedulers may share the same dispatcher, such as the dispatcher 214.

The non-latency scheduler 216 may implement a semaphore 222. In various embodiments, the semaphore is an abstract data type that provides an abstraction for controlling access by multiple threads to one or more resources, such as the cores 106(1)-106(N) of a multi-core processor 102. The semaphore 222 may track the numbers of concurrent threads that are executing on the cores 106(1)-106(N). Accordingly, the non-latency scheduler 216 may release a blocked thread to execute on a core when the semaphore 222 indicates that a core is available or becomes available. Thus, by using the semaphore 222, the non-latency scheduler 216 may at any time enable a predetermined number of threads to execute on the cores 106(1)-106(N), while blocking other threads from executing due to the lack of available cores. In various embodiments, the number of threads that the non-latency scheduler 216 may permit to concurrently execute on the cores 106(1)-106(N) may be one less than the number of the cores 106(1)-106(N). Such a limitation may prevent the occurrence of race conditions or deadlocks as tasks are switched between the cores 106(1)-106(N). For example, when the limitation is reached, the operating system 202 may prevent the creation of additional threads to execute real-time tasks.

The queue 218 may store switch objects, such as the switch object 120, which indicate the affinities of the specific threads to particular cores. For example, the switch object 120 may include affinity data that indicates that a specific thread (e.g., callee thread 112) has an affinity for the core 106(2). In this way, the queue 218 may play an important role in the core switch 118.

In at least one embodiment, the switching of the performance of the real-time task 110 from the caller thread 108 to the callee thread 112 may be initiated when the caller thread 108 requests a thread affinity 224 for an alternative core from the dispatcher 214. In turn, the dispatcher 214 may allocate an available core (e.g., the core 106(2)) of the cores 106(1)-106(n) to the caller thread 108. The caller thread 108 may store the thread affinity 224 for the allocated core (e.g., core 106(2)) in the switch object 120. The caller thread 108 may further place the switch object 120 in a memory space included in the queue 218.

The caller thread 108 may then perform the wake up 116 of the callee thread 112. In various embodiments, the caller thread 108 may perform the wake up 116 by causing the non-latency scheduler 216 to change the callee thread 112 from the wait state 114 to an executing state, and updating the semaphore 222 to release the callee thread 112 for execution. In return, the executing callee thread 112 may retrieve the switch object 120 and set its affinity to the allocated core (e.g., core 106(2)) based on the thread affinity 224. Subsequently, the caller thread 108 and the callee thread 112 may exchange the callee ready indicator 122 and the caller ready indicator 124 using the variable in the switch object 120 as described in FIG. 1. The exchange may switch the performance of the real-time task 110 from the caller thread 108 that is executing on the core 106(1) to the callee thread 112 that is executing on the core 106(2).

In alternative embodiments, switching the performance of the real-time task 110 from the caller thread 108 to the callee thread 112 may be initiated when the callee thread 112 wakes up from the wait state 114 and requests a thread affinity for an alternative core from the dispatcher 214. If the request is successful, the callee thread 112 may directly write a callee ready indicator 122 to the variable in the switch object 120. Subsequently, the callee thread 112 may continuously check for a caller ready indicator 124 from the caller thread 108.

When the caller thread 108 detects the callee ready indicator 122 in the variable of the shared memory space, the caller thread 108 may write the caller ready indicator 124 to the variable and then enter a wait state 126. In turn, when the callee thread 112 determines that the caller ready indicator 124 is in the variable, the callee thread 112 may start performing the real-time task 110 on the core 106(2).

In such embodiments, the use of the callee thread 112 to request a thread affinity for the alternative core 106(2) may relieve the caller thread 108 the burden of having to both perform the real-time task 110 and request an allocation of the alternative core 106(2) from the dispatcher 214. Thus, since the caller thread 108 is solely responsible for performing the real-time task 110, performance speed of the real-time task 110 by the caller thread 108 may be improved.

In various embodiments, the dynamic switch manager 204 may further implement a dampen mechanism 226 to prevent tailgating. Tailgating is the problem of a thread that performs a real-time task occupying a core immediately after a previous thread that performs a real-time task has switched to another core. For example, when the caller thread 108 releases the cores 106(1) and enters the wait state 126 after terminating the performance of the real-time task 110, there is a possibility that the non-latency scheduler 216 may immediately assign the core 106(1) to execute another thread that performs another real-time task. This occurrence may defeat the purpose of performing the core switch 118 as there is no net performance of any non real-time tasks by the core 106(1). The dampen mechanism 226 may dampen a newly released core (e.g., core 106(1)) that was executing a thread performing a real-time task for a predetermined amount of time (e.g., 100 milliseconds), before the newly released core may be allocated to another thread that is performing a real-time task. This dampening may provide an opportunity for the non-latency scheduler 216 to assign the newly released core to another thread to perform a non real-time task. However, in the event that newly released core was not allocated to perform the non real-time task during the dampening interval, the core may be allocated to once again execute a thread that performs a real-time task.

The applications 212 may be applications that execute in a desktop environment provided by the operating system 202. The applications 212 may include applications that perform real-time tasks, as well as applications that perform non real-time tasks. In various embodiments, the applications 212 may include productivity application, entertainment applications, communication application, and/or so forth. In at least one embodiment, the applications 212 may include an interface application that enables a system administrator to assign specific cores of the multi-core processor 102 to execute threads that perform real-time tasks and/or adjust the time intervals used by the caller thread 108 and the callee thread 112 during the core switch 118.

Thus, by applying instances of core switching on a periodic basis for multiple threads that execute real-time tasks, the dynamic switch manager 204 may make certain that no core in the multi-core processor 102 is continuously executing threads that perform real-time tasks, thereby ensuring that non real-time tasks may be executed by the multi-core processor 102.

Example Processes

FIGS. 3-6 describe various example processes for implementing dynamic switching of a real-time task from being performed by a current core to being performed by an alternative core. The order in which the operations are described in each example process is not intended to be construed as a limitation, and any number of the described operations can be combined in any order and/or in parallel to implement each process. Moreover, the operations in each of the FIGS. 3-6 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 3:
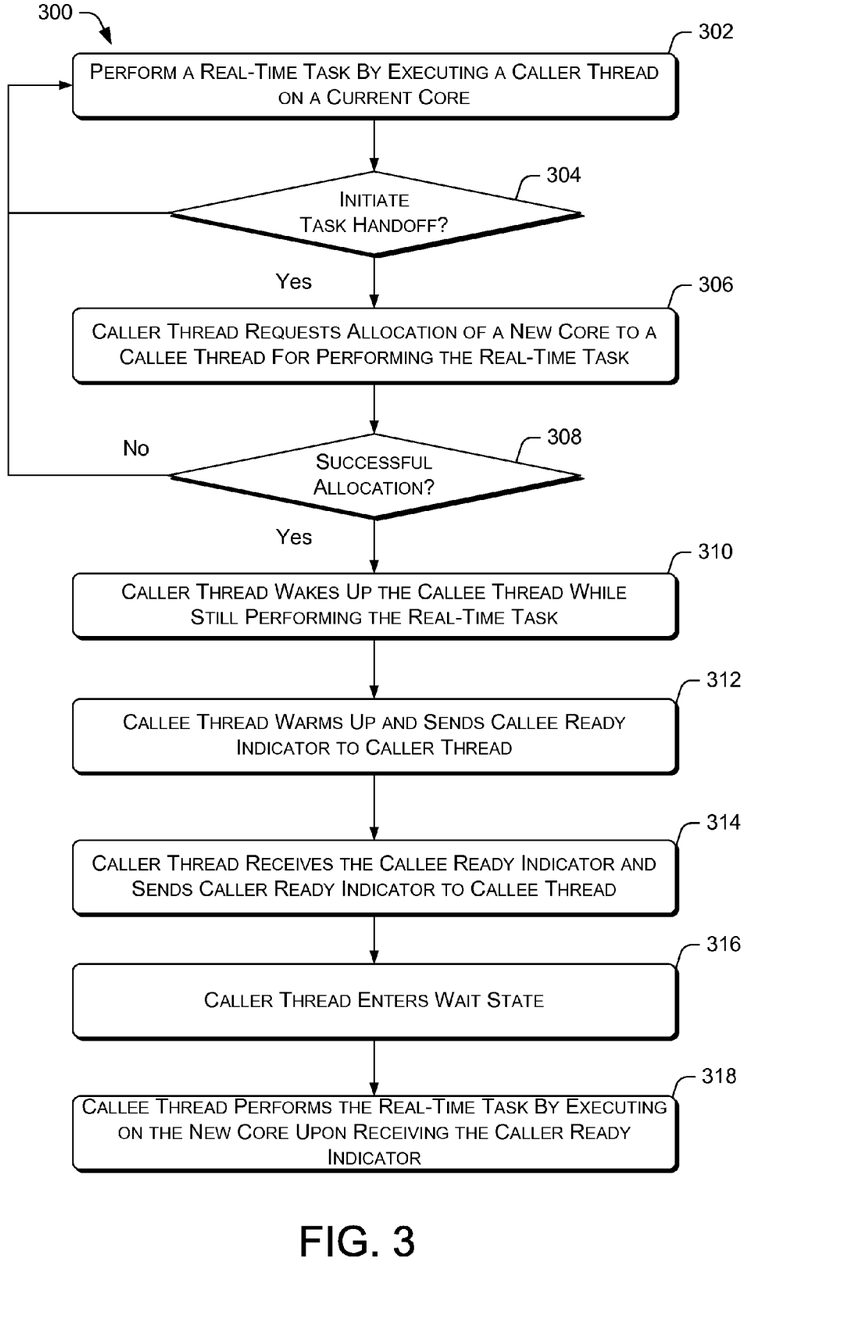
FIG. 3 is a flow diagram that illustrates an example process for dynamically switching a real-time task from being performed by a current thread executing on a current core to being performed by a new thread executing on an alternative core via caller thread initiated core allocation.

FIG. 3 is a flow diagram that illustrates an example process 300 for dynamically switching a real-time task from being performed by a current thread executing on a current core to being performed by a new thread executing on an alternative core via caller thread initiated core allocation.

At block 302, the caller thread 108 may be executing on a current core of a multi-core processor 102, such as the core 106(1), to perform a real-time task 110. The real-time task may be a high priority task that is to be performed without delay. For example, it may be essential for a computing device that is communicating with a network to perform the task of parsing out data from a communication signal without delay to avoid losing data. Accordingly, in some embodiments, threads that handle real tasks may have higher priority than threads that handle non-real time tasks. Thus, in some instances, threads that handle real tasks may be referred to as high priority threads.

At decision block 304, the caller thread 108 may determine whether it is time to initiate a handoff of the real-time task 110. In various embodiments, the caller thread 108 may initiate the task handoff if a predetermined time interval has elapsed. The caller thread 108 may make such an assessment on a continuous and/or periodic basis.

Accordingly, if the caller thread 108 determines that it is not yet time to initiate the task handoff ("no" at decision block 304), the process 300 may loop back to block 302 so the caller thread 108 may continue to use the core 106(1) to perform the real-time task 110. However, if the caller thread 108 determines that it is time to initiate a handoff of the real-time task 110 ("yes" at decision block 304), the process 300 may continue to block 306.

At block 306, the caller thread 108 may request allocation of an alternative core to a callee thread, such as the callee thread 112, for performing of the real-time task 110. In various embodiments, the caller thread 108 may request the alternative core from the dispatcher 214. The alternative core may be an available core of the multi-core processor 102 that is assigned by the dispatcher 214 on a round robin, fair usage, prioritized, or random basis.

At decision block 308, the caller thread 108 may determine whether the allocation of the alternative core is successful. The allocation may be successfully when there is an available core for the dispatcher 214 to allocate to the callee thread. However, if all of the cores 106(1)-106(N) are executing threads at the time of the allocation request by the caller thread 108, no allocation may be made. Thus, if the caller thread 108 determines that the allocation is not successful, the process 300 may loop back to 302 so the caller thread 108 may continue to use the current core to perform the real-time task 110 for another predetermined time interval. However, if the caller thread 108 determines that the allocation is successful ("yes" at decision block 308), the process 300 may continue to block 310.

At block 310, the caller thread 108 may wake up the callee thread 112 while still performing the real-time task 110. The wake up 116 may include changing the callee thread 112 from the wait state 114 to an executing state by updating the semaphore 222 to release the callee thread 112 for execution.

At block 312, the callee thread 112 may warm up and send the callee ready indicator 122 to the caller thread 108 via a variable in the switch object 120. The warm up of the callee thread 112 may include the callee thread 112 obtaining information on the allocated alternative core, such as the core 106(2). The switch object 120 may be stored in a memory space that is accessible to the callee thread 112, such as the queue 218. The callee thread 112 may then continuously check the variable for the caller ready indicator 124 from caller thread 108.

At block 314, the caller thread 108 may receive the callee ready indicator 122 and send the caller ready indicator 124 to the callee thread 112. The caller thread 108 may receive the callee ready indicator 122 by periodically checking the variable in the switch object 120. Further, the caller thread 108 may send the caller ready indicator 124 by writing the caller ready indicator 124 to the variable in the switch object 120.

At block 316, the caller thread 108 may go into the wait state 126. As a result, the core 106(1) may be freed up to perform non real-time tasks, such as the conventional task 128. In various embodiments, the core 106(1) may be prevented by the dampen mechanism 226 from executing a thread that performs a real-time task for a predetermined amount of time, so that a thread that is performing a conventional task, such as the conventional task 128, may have an opportunity to execute on the core 106(1).

At block 318, the callee thread 112 may start executing the real-time task 110 on the alternative core 106(2) upon receiving the caller ready indicator 124 from the caller thread 108. In this way, the callee thread 112 may become a caller thread that takes over the performance of the real-time task 110.

Figure 4:
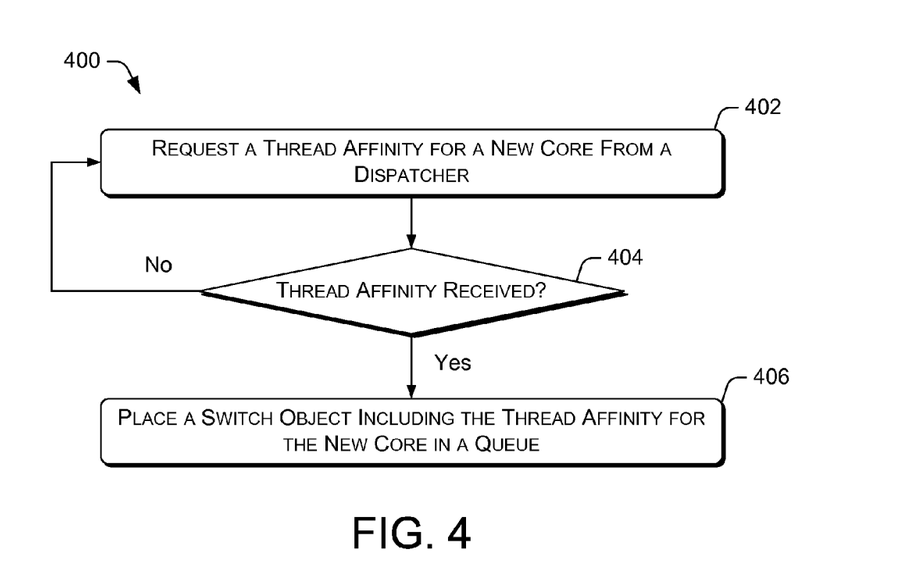
FIG. 4 is a flow diagram that illustrates an example process for assigning a thread affinity for an alternative core to a real-time task that is being performed by a current thread on a current core.

FIG. 4 is a flow diagram that illustrates an example process 400 for assigning a thread affinity for an alternative core to a real-time task that is being performed by a current thread on a current core. The process 400 may further describe the allocation of an alternative core to a callee thread as illustrated in block 306 of FIG. 3.

At block 402, the caller thread 108 may request a thread affinity (e.g., the thread affinity 224) for an alternative core, such as the core 106(2), from the dispatcher 214. The thread affinity for a core, when applied to a thread, may enable the thread to execute on the core. The dispatcher 214 may assign a thread affinity for an available core on a round robin basis, fair usage basis, a prioritized basis, a random basis, or on some other basis. However, in some instances, the dispatcher 214 may fail to allocate a thread affinity when none of the cores 106(1)-106(N) are available.

At decision block 404, the caller thread 108 may determine whether a thread affinity for the alternative core is received from the dispatcher 214. Thus, if the caller thread 108 determines that the thread affinity is not received ("no" at decision block 404), the process 400 may loop back to block 402. At block 402, the caller thread 108 may, after a passage of predetermined time interval, once again request the thread affinity for an alternative core.

However, if the caller thread 108 determines that the thread affinity is received ("yes" at decision block 404), the process 400 may proceed to block 406. At block 406, the caller thread 108 may place a switch object 120 that includes the thread affinity for the alternative core in the queue 218.

Figure 5:
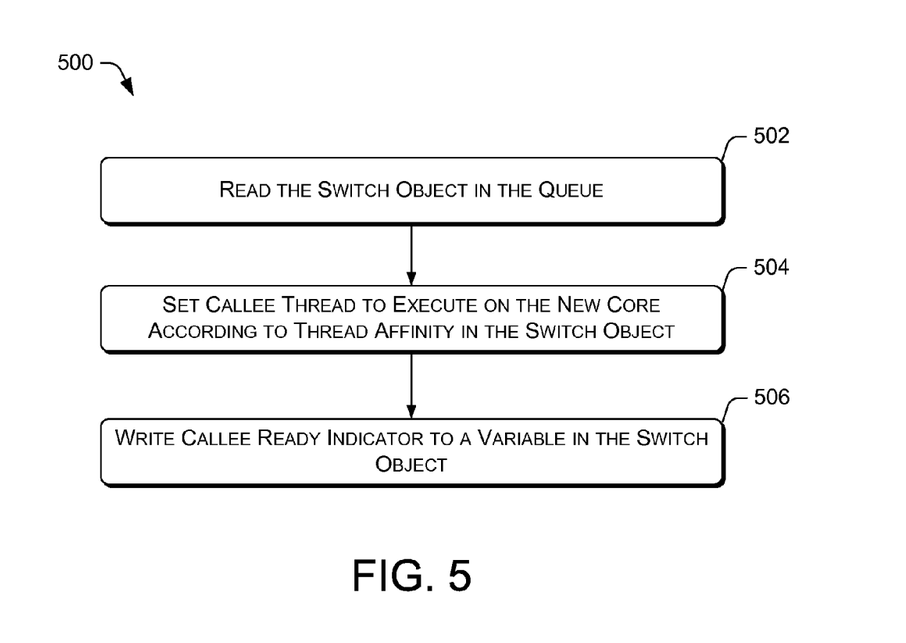
FIG. 5 is a flow diagram that illustrates an example process for setting the thread affinity of a new thread to perform the real-time task on an alternative core.

FIG. 5 is a flow diagram that illustrates an example process 500 for setting the thread affinity of a new thread to perform the real-time task on an alternative core. The process 500 may further describe block 312 of FIG. 3.

At block 502, the callee thread 112 may read the switch object 120 in the queue 218 for a thread affinity, such as the thread affinity 224. In various embodiments, the callee thread 112 may perform the read after being awoken from the wait state 114 to an execution state. The thread affinity 224 may be requested by a caller thread 108 that is performing the real-time task 110.

At block 504, the callee thread 112 may be set to execute on an alternative core, such as the core 106(2), according to the thread affinity 224 in the switch object 120. The callee thread 112 may eventually take over the execution of the real-time task 110.

At block 506, the callee thread 112 may write a callee ready indicator 122 to a variable in the switch object 120. The switch object 120 may be stored in a memory space that is accessible to the callee thread 112, such as the queue 218.

Figure 6:
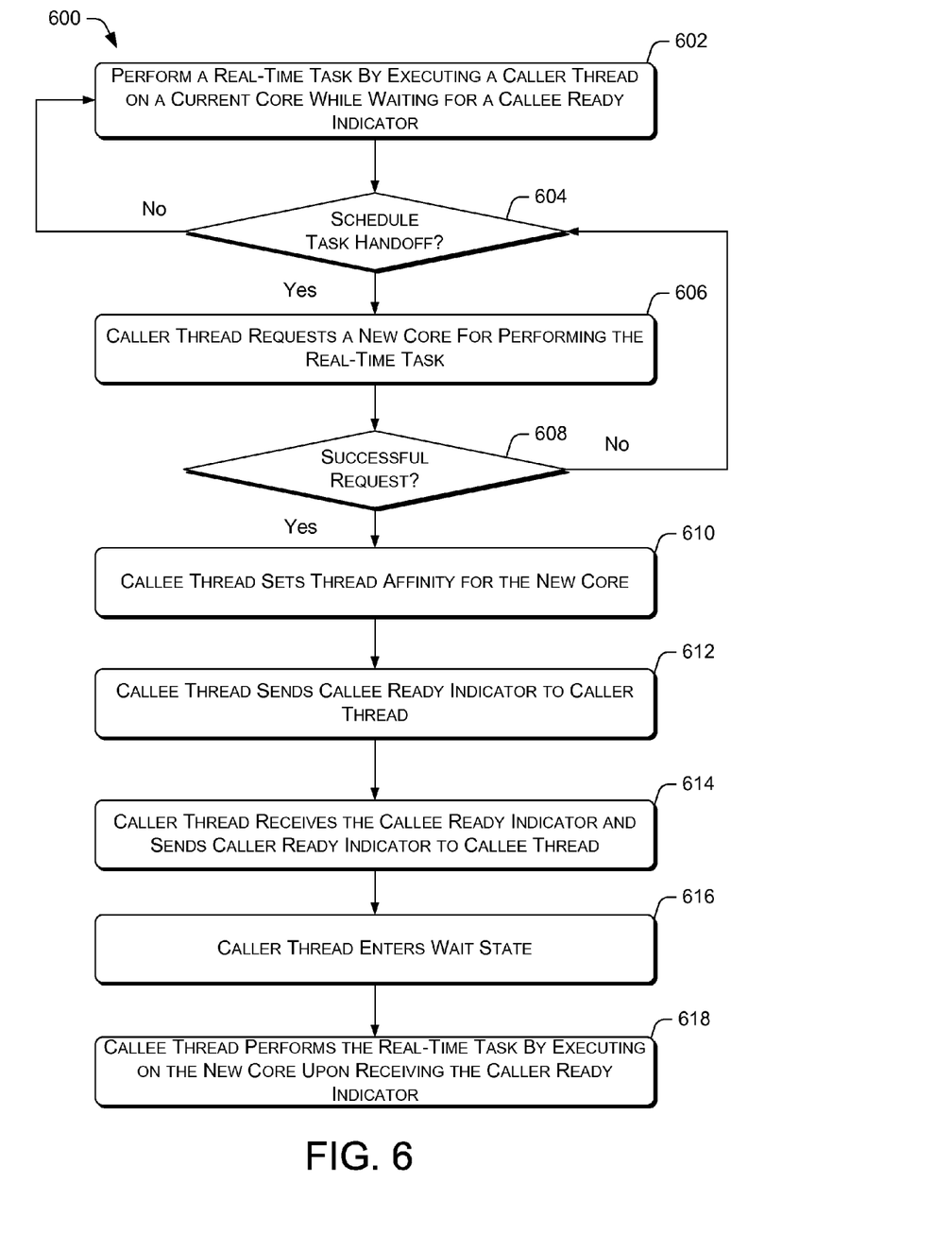
FIG. 6 is a flow diagram that illustrates an example process for dynamically switching a real-time task from being performed by a current thread executing on a current core to being performed by a new thread executing on an alternative core via callee thread initiated core allocation.

FIG. 6 is a flow diagram that illustrates an example process 600 for dynamically switching a real-time task from being performed by a current thread executing on a current core to being performed by a new thread executing on an alternative core via callee thread initiated alternative core allocation.

At block 602, the caller thread 108 may be executing on a current core of a multi-core processor 102, such as the core 106(1), to perform a real-time task 110. The real-time task may be a high priority task that is to be performed without delay. Additionally, the caller thread 108 may periodically check for a callee ready indicator 122 from a callee thread, such as the callee thread 112.

At decision block 604, the callee thread 112 may determine whether it is time to initiate a handoff of the real-time task 110. In various embodiments, the callee thread 112 may initiate the task handoff if a predetermined time interval has elapsed (e.g., 128 milliseconds). The callee thread 112 may make such an assessment on a continuous or periodic basis.

Accordingly, if the callee thread 112 determines that it is not yet time to initiate the task handoff ("no" at decision block 604), the process 600 may loop back to block 602 so the caller thread 108 may continue to use the current core to perform the real-time task 110. However, if the callee thread 112 determines that it is time to initiate a handoff of the real-time task 110 ("yes" at decision block 604), the process 600 may continue to block 606.

At block 606, the callee thread 112 may request an alternative core, such as the core 106(2), for executing the real-time task 110. In various embodiments, the callee thread 112 may request the alternative core from the dispatcher 214. The alternative core may be an available core of the multi-core processor 102 that is assigned by the dispatcher 214 on a round robin basis, a prioritized basis, fair usage basis, a random basis, or on some other basis.

At decision block 608, the callee thread 112 may determine whether it successfully requested the alternative core. The request may be successfully when there is an available core for the dispatcher 214 to allocate, and the dispatcher 214 return a thread affinity for the alternative core. However, if all of the cores 106(1)-106(N) of the multi-core processor 102 are executing threads at the time of the request by the caller thread 108, the request may fail and no core may be allocated by the dispatcher 214. Thus, if the caller thread 108 determines that the request is not successful, the process 600 may loop back to 604, so that the callee thread 112 may once again determine a next time to initiate a handoff the real-time task 110. However, if the callee thread 112 determines that the allocation is successful ("yes" at decision block 608), the process 600 may continue to block 610.

At block 610, the callee thread 112 may configure itself to execute on the alternative core according to the thread affinity provided by the dispatcher 214. At block 612, the callee thread 112 may send a callee ready indicator 122 to the caller thread 108 via a variable in the switch object 120. The switch object 120 may be stored in a memory space that is accessible to the callee thread 112, such as the queue 218. The callee thread 112 may then continuously check the variable for a caller ready indicator 124 from caller thread 108.

At block 614, the caller thread 108 may receive the callee ready indicator 122 and send the caller ready indicator 124 to the callee thread 112. The caller thread 108 may receive the callee ready indicator 122 by periodically checking the variable in the switch object 120. Further, the caller thread 108 may send the caller ready indicator 124 by writing the caller ready indicator 124 to the variable in the switch object 120.

At block 616, the caller thread 108 may go into the wait state 126. As a result, the core 106(1) may be freed up to perform non real-time tasks, such as the conventional task 128. In various embodiments, the core 106(1) may be prevented by the dampen mechanism 226 from executing a thread that performs a real-time task for a predetermined amount of time, so that another thread that is performing a conventional task, such as the conventional task 128, may have an opportunity to execute on the core.

At block 618, the callee thread 112 may start executing the real-time task 110 on the alternative core 106(2) upon receiving the caller ready indicator 124 from the caller thread 108. In this way, the callee thread 112 may become a caller thread that takes over the performance of the real-time task 110.

The switching of a real-time task from being performed by a first thread executing on a current core of a multi-core processor to being performed by a second thread executing on an alternative core of the multi-core processor may free up the current core to execute a thread that performs a non real-time task. Further, by performing multiple instances of switching on a periodic basis, a computing device may reduce or eliminate system blockage caused by the continuous performance of real-time tasks. As a result, instances of deadlocked applications, disabled application features, and/or general unresponsiveness in the operations of applications executing on the computing device may be diminished.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A computer storage media storing computer-executable instructions that, when executed, cause one or more processors to perform acts comprising:
    performing a real-time task execution using a first thread on a current core of a multi-core processor;
    acquiring, by the first thread and based at least in part on a predetermined event, a thread affinity for a second thread that executes on an alternative core of the multi-core processor,
    storing, by the first thread, the thread affinity in a queue that is accessible to the first thread and the second thread;
    obtaining, by the second thread, the thread affinity from the queue;
    initiating the second thread to take over performance of the real-time task on the alternative core of the multi-core processor while the first thread is performing the real-time task on the current core; and
    transferring, in order to free up the current core, performance of the real-time task from the first thread to the second thread after the second thread is executing on the alternative core to perform the real-time task.

2. The computer storage media of claim 1, the acts further comprising performing a non real-time task by executing the first thread on the current core or another core of the multi-core processor following the transferring.

3. The computer storage media of claim 1, wherein the initiating includes changing the second thread from a wait state to an executing state.

4. The computer storage media of claim 1, wherein the first thread acquires the thread affinity by requesting an allocation of the alternative core.

5. The computer storage media of claim 1, wherein the obtaining the thread affinity includes obtaining the thread affinity from a switch object in the queue that is accessible to the first thread and the second thread.

6. The computer storage media of claim 1, wherein the initiating includes requesting an allocation of the alternative core using the second thread following an elapse of a predetermined time interval.

7. The computer storage media of claim 1, wherein the alternative core is allocated for the performance of the real-time task on a round robin basis, a fair usage basis, a prioritized basis, or a random basis.

8. The computer storage media of claim 1, wherein the transferring includes:
    sending a thread ready indicator from the second thread to the first thread upon the second thread obtaining the thread affinity and being executed on the alternative core;
    providing an additional thread ready indicator from the first thread to the second thread and placing the first thread in a wait state upon the first thread receiving the thread ready indicator; and
    performing the real-time task in the second thread on the alternative core of the multi-core processor.

9. A computer-implemented method, comprising:
    performing a real-time task by executing a first thread on a current core of a multi-core processor;
    acquiring, by the first thread and based at least in part on a predetermined event, a thread affinity for a second thread to take over performance of the real-time task on an alternative core in order to free up the current core;
    storing, by the first thread, the thread affinity in a queue that is accessible to both the first thread and the second thread;
    obtaining, by the second thread, the thread affinity from the queue;
    initiating the second thread to take over performance of the real-time task on the alternative core while the first thread is performing the real-time task on the current core:
    transferring, in order to free up the current core, performance of the real-time task from the first thread to the second thread after the second thread is executing on the alternative core to perform the real-time task.

10. The computer-implemented method of claim 9, further comprising executing an additional thread on the current core to perform a non real-time task after the second thread begins executing the real-time task on the alternative core.

11. The computer-implemented method of claim 9, further comprising preventing, for at least a predetermined time period, the current core from executing an additional thread that performs another real-time task after the first thread terminates execution on the current core to enter the wait state.

12. The computer-implemented method of claim 9, further comprising passing a thread ready indicator and an additional thread ready indicator between the first thread and the second thread using a variable in a memory space that is accessible to both the first thread and the second thread.

13. The computer-implemented method of claim 9, wherein the alternative core is an available core of the multi-core processor that is allocated to the second thread on a round robin basis, a fair usage basis, a prioritized basis, or a random basis.

14. The computer-implemented method of claim 9, wherein the acquiring includes using the second thread to initiate an allocation request for the alternative core following an elapse of a predetermined time interval.

15. A computing device, comprising:
   a multi-core processor; and
   a memory that includes a plurality of computer-executable components, comprising:
      a scheduler that schedules a real-time task to be performed by threads executing on multiple cores of the multi-core processor, the threads including a first thread that executes on a first core of the multiple cores to perform the real-time task, and a second thread that obtains a thread affinity for taking over performance of the real-time task on a second core of the multiple cores;
      a queue that is accessible to the first thread and the second thread, wherein the first thread acquires, based at least in part on a predetermined event, the thread affinity and stores the thread affinity in the queue, and wherein the second thread obtains the thread affinity from the queue; and
      a dispatcher that initiates the second thread to take over performance of the real-time task on the second core of the multi-core processor while the first thread is performing the real-time task;
   wherein, in order to free up the current core, performance of the real-time task is transferred from the first thread to the second thread after the second thread is executing on the alternative core to perform the real-time task.

16. The computing device of claim 15, wherein the queue stores a switch object that tracks the thread affinity.

17. The computing device of claim 15, wherein the first thread is to terminate execution on the first core upon transfer of the performance of the real-time task to the second core.

18. The computing device of claim 17, further comprising a dampen mechanism that prevents the first core from executing a thread that performs another real-time task for a predetermined time period after the first thread terminates execution on the first core.

19. The computer storage media of claim 1, wherein the predetermined event comprises a predetermined time interval.

20. The computer-implemented method of claim 9, wherein the predetermined event comprises a predetermined time interval.

\* \* \* \* \*